United States Patent
Moetakef (10) Patent No.: US 11,041,435 B2
(45) Date of Patent: Jun. 22, 2021

(54) COUNTERBALANCE GEAR FOR AN ENGINE

(71) Applicant: Ford Global Technologies, LLC, Dearborn, MI (US)

(72) Inventor: Mohammad Ali Moetakef, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 441 days.

(21) Appl. No.: 15/711,271

(22) Filed: Sep. 21, 2017

(65) Prior Publication Data

US 2019/0085763 A1    Mar. 21, 2019

(51) Int. Cl.
| | | |
|---|---|---|
| *F02B 75/06* | (2006.01) | |
| *F16H 55/16* | (2006.01) | |
| *F16F 7/12* | (2006.01) | |
| *F16F 15/12* | (2006.01) | |
| *F16H 55/14* | (2006.01) | |
| *F16H 55/17* | (2006.01) | |
| *F16F 15/26* | (2006.01) | |

(52) U.S. Cl.
CPC ............. *F02B 75/06* (2013.01); *F16F 7/128* (2013.01); *F16F 15/1207* (2013.01); *F16F 15/264* (2013.01); *F16H 55/14* (2013.01); *F16H 55/16* (2013.01); *F16H 55/17* (2013.01)

(58) Field of Classification Search
CPC ....... F02B 75/06; F16F 15/1207; F16F 7/128; F16H 55/14; F16H 55/16
USPC ...................................................... 123/192.1
See application file for complete search history.

(56) References Cited

U.S. PATENT DOCUMENTS

| | | | |
|---|---|---|---|
| 6,283,076 B1 | 9/2001 | Simpson | |
| 6,305,242 B1* | 10/2001 | Smith | F01L 1/02 |
| | | | 123/90.27 |
| 6,626,139 B1* | 9/2003 | Horita | F16F 15/12 |
| | | | 123/192.2 |
| 2009/0255503 A1* | 10/2009 | Fujiwara | F16F 15/26 |
| | | | 123/192.2 |
| 2009/0277414 A1* | 11/2009 | Lee | F02B 75/06 |
| | | | 123/192.2 |

FOREIGN PATENT DOCUMENTS

| | | |
|---|---|---|
| CN | 2898459 Y | 5/2007 |
| CN | 202284637 U | 6/2012 |
| CN | 206145094 U | 5/2017 |

* cited by examiner

*Primary Examiner* — Lindsay M Low
*Assistant Examiner* — Omar Morales
(74) *Attorney, Agent, or Firm* — Brooks Kushman P.C.; Geoffrey Brumbaugh (57) ABSTRACT

An engine system is provided with a crankshaft gear coupled to a crankshaft of an engine for rotation therewith, and a balance gear coupled to a balance shaft for rotation therewith. The balance gear and crankshaft gear are in meshed engagement. The balance gear is formed by a series of sectors connected by a series of resilient blocks, with each sector defining first and second recesses along opposite radial edges sized to receive adjacent blocks, respectively. Each elastomeric block is configured to deform both normally and in shear thereby providing damping for the gear. A gear such as the balance gear, and a method of forming the gear are also provided.

16 Claims, 9 Drawing Sheets

COUNTERBALANCE GEAR FOR AN ENGINE

TECHNICAL FIELD

Various embodiments related to a gear such as a counterbalance gear on a counterbalance shaft for an engine.

BACKGROUND

Vehicles commonly use intermeshed gears to transmit torque or power in the vehicle, and to operate various vehicle systems or components. The vehicle is provided with an internal combustion engine and a transmission system, each of which may include intermeshing gears. Balance shafts, or counterbalance shafts, may be used with internal combustion engines to cancel unbalanced loads in the engine which are developed from engine operation. A gear train including intermeshed gears is commonly used to transfer rotation to the balance shaft, for example, from a crankshaft.

In conventional engine and counterbalance shaft systems, the intermeshed gears are provided by metal gears; however, these gears may provide limited damping, and the material stiffness properties may result in or be the source of tonal noise (whine), rattle, or other noise vibration and harshness (NVH). The gear-to-gear interaction may result in noise commonly referred to as gear whine. Gear whine is mainly due to the transmission error between meshing teeth of the two gears and may be dependent on several factors including torsional load, gear design, tooth profile, total number of teeth, number of contacting teeth, gear mass, and inertia. Gear whine may be increased in cases with high torsional excitations and may further increase at various orders or harmonics. Metal gears may result in high contact forces at the intermeshing gear teeth due to gear mesh frequencies and lead to whine. Additionally, gear teeth separations caused by gear backlash and the pulsation in the torque or load applied to the gear train may result in a rattling noise. Alternative materials for use in forming the intermeshed gears, such as a plastic, may be limited, based on the high level of torque fluctuations. For example, with a counterbalance shaft on an engine, the torque spikes may be as high as 150 N·m, and alternative materials may have insufficient durability for these applications.

SUMMARY

In an embodiment, an engine system is provided with a crankshaft gear coupled to a crankshaft of an engine for rotation therewith, and a balance gear coupled to a balance shaft for rotation therewith. The balance gear and crankshaft gear are in meshed engagement. The balance gear is formed by a series of sectors connected by a series of resilient blocks, with each sector defining first and second recesses along opposite radial edges sized to receive adjacent blocks, respectively.

In another embodiment, a gear for a vehicle shaft is provided with (n) metal sectors and (n) elastomeric blocks, each block positioned between and connecting adjacent sectors to be spaced apart from one another. Each sector has first and second faces extending radially outwardly from an arc-shaped inner side to an arc-shaped outer side, with the outer side defining a series of teeth. Each sector has first and second sides extending radially between and intersecting the inner and outer sides, with the first side defining a first recess and the second side defining a second recess. A portion of each block is received by the first recess of one of the sectors, and another portion of each block is received by the second recess of another one of the sectors.

In yet another embodiment, a method is provided. A series of gear sectors are formed with each sector extending from an arc-shaped inner side to an arc-shaped outer side. The outer side defines a series of teeth. Each sector has first and second sides extending radially between and intersecting the inner and outer sides. The first side defines a first recess, and the second side defines a second recess. A series of elastomeric blocks is formed. Each block of the series of blocks is positioned between adjacent gear sectors and received by the first recess of one of the sectors and the second recess of an adjacent sector. The series of blocks and the series of gear sectors are connected to one another to form a gear for a vehicle shaft with adjacent sectors spaced apart from one another. Each elastomeric block deforms both normally and in shear thereby providing damping for the gear.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
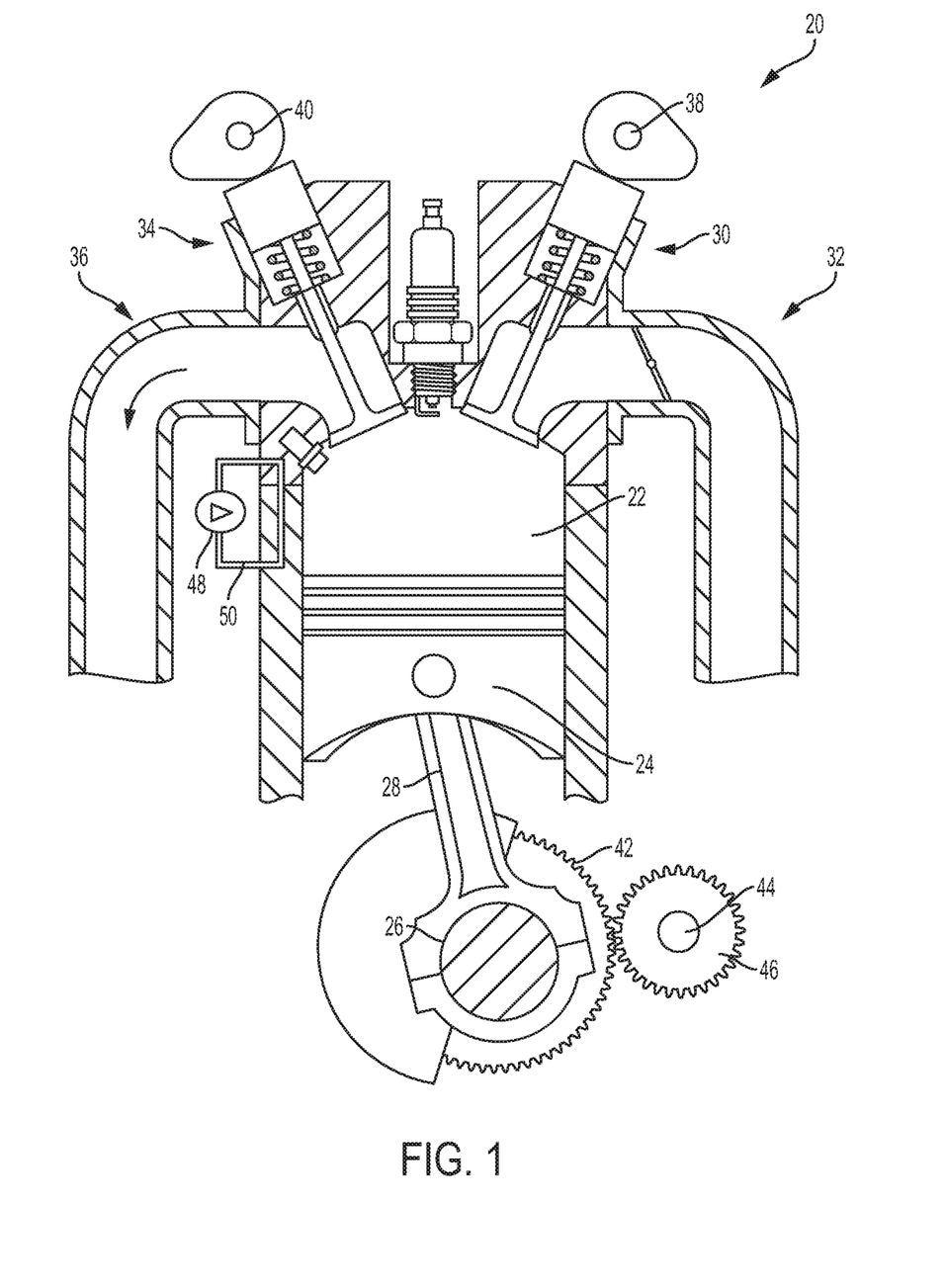
FIG. 1 illustrates a schematic of an internal combustion engine configured to implement various embodiments according to the present disclosure.

FIG. 1 illustrates a schematic of an internal combustion engine system 20 configured to implement various embodiments according to the present disclosure. In some embodiments, the engine 20 is used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

The engine 20 has a cylinder block and a cylinder head that cooperate to define a plurality of cylinders 22, with one cylinder is illustrated. The engine 20 may have one cylinder, two cylinders, three cylinders, four cylinders, or more than four cylinders. A piston 24 is positioned within each cylinder and is connected to a crankshaft 26 via a connecting rod 28.

One or more intake valves 30 controls flow from an intake manifold 32 into the cylinder 22. One or more exhaust valves 34 controls flow from the cylinder 22 to an exhaust manifold 36. The intake and exhaust valves 30, 34 may be operated in various ways as is known in the art to control the engine operation. The engine 20 is illustrated as having the intake valve 30 and exhaust valve 34 each with an associated camshaft 38, 40, respectively, in a direct overhead cam configuration. The engine and valves 30, 34 may be configured in various manners as is known in the art, for example, as a single overhead camshaft, dual overhead camshaft, direct camshaft actuation, an overhead valve configuration with the valves operated by pushrods or rockers, and the like. The camshafts 38, 40 may be rotationally connected to and driven by the crankshaft 26, and in one embodiment, are driven by a gear train according to the present disclosure as described below.

Each cylinder 22 may operate under a four-stroke cycle including an intake stroke, a compression stroke, an ignition stroke, and an exhaust stroke. In other embodiments, the engine may operate with a two stroke cycle. The piston 24 position at the top of the cylinder 22 is generally known as top dead center (TDC). The piston 24 position at the bottom of the cylinder is generally known as bottom dead center (BDC).

During the intake stroke, the intake valve(s) 30 opens and the exhaust valve(s) 34 closes while the piston 24 moves from the top of the cylinder 22 to the bottom of the cylinder 22 to introduce air from the intake manifold to the combustion chamber.

During the compression stroke, the intake and exhaust valves 30, 34 are closed. The piston 24 moves from the bottom towards the top of the cylinder 22 to compress the air within the combustion chamber.

Fuel is introduced into the combustion chamber and ignited. The engine may be provided as a spark ignition engine or as a compression ignition engine. During the expansion stroke, the ignited fuel air mixture in the combustion chamber expands, thereby causing the piston 24 to move from the top of the cylinder 22 to the bottom of the cylinder 22. The movement of the piston 24 causes a corresponding movement in crankshaft 26 and provides for a mechanical torque output from the engine 20.

During the exhaust stroke, the intake valve(s) 30 remains closed, and the exhaust valve(s) 34 opens. The piston 24 moves from the bottom of the cylinder to the top of the cylinder 22 to remove the exhaust gases and combustion products from the combustion chamber by reducing the volume of the chamber. The exhaust gases flow from the combustion cylinder 22 to the exhaust manifold 36.

The intake and exhaust valves 30, 34 positions and timing, as well as the fuel injection timing and ignition timing may be varied for the various engine strokes.

The crankshaft 26 may be provided with a crankshaft gear 42 or drive gear 42. A balance shaft 44 may be provided with a balance gear 46 or driven gear 46 in meshed engagement with the drive gear 42. The crankshaft 26 may have additional drive gears mounted thereon, or gear trains in meshed engagement with the drive gear to drive other engine or vehicle systems according to the present disclosure, including gear trains to drive the camshafts 38, 40, a pump 48 in a cooling or lubricating system 50 for the engine, a fuel pump, a supercharger or other forced induction system, a vacuum pump, an alternator, and the like.

Figure 2:
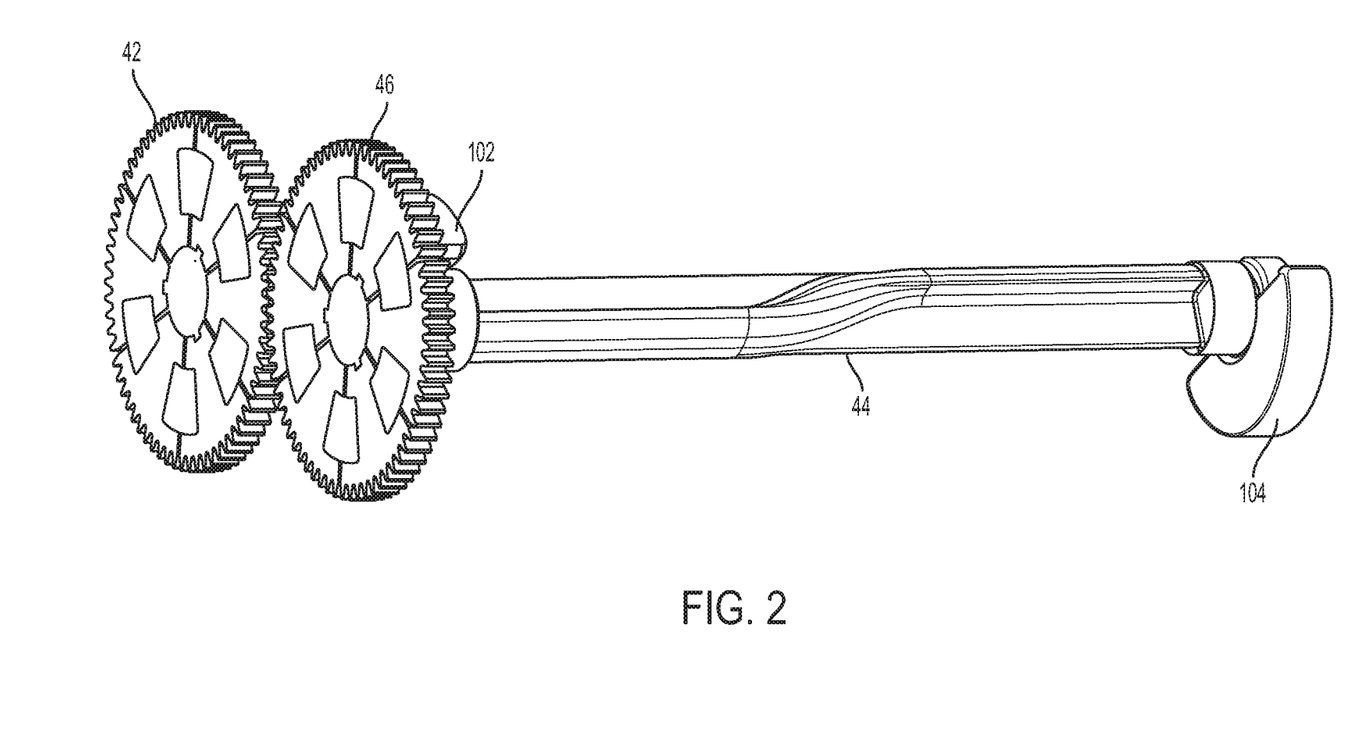
FIG. 2 illustrates a perspective view of a crankshaft and balance shaft assembly for the engine of FIG. 1 according to an embodiment.
Figure 3:
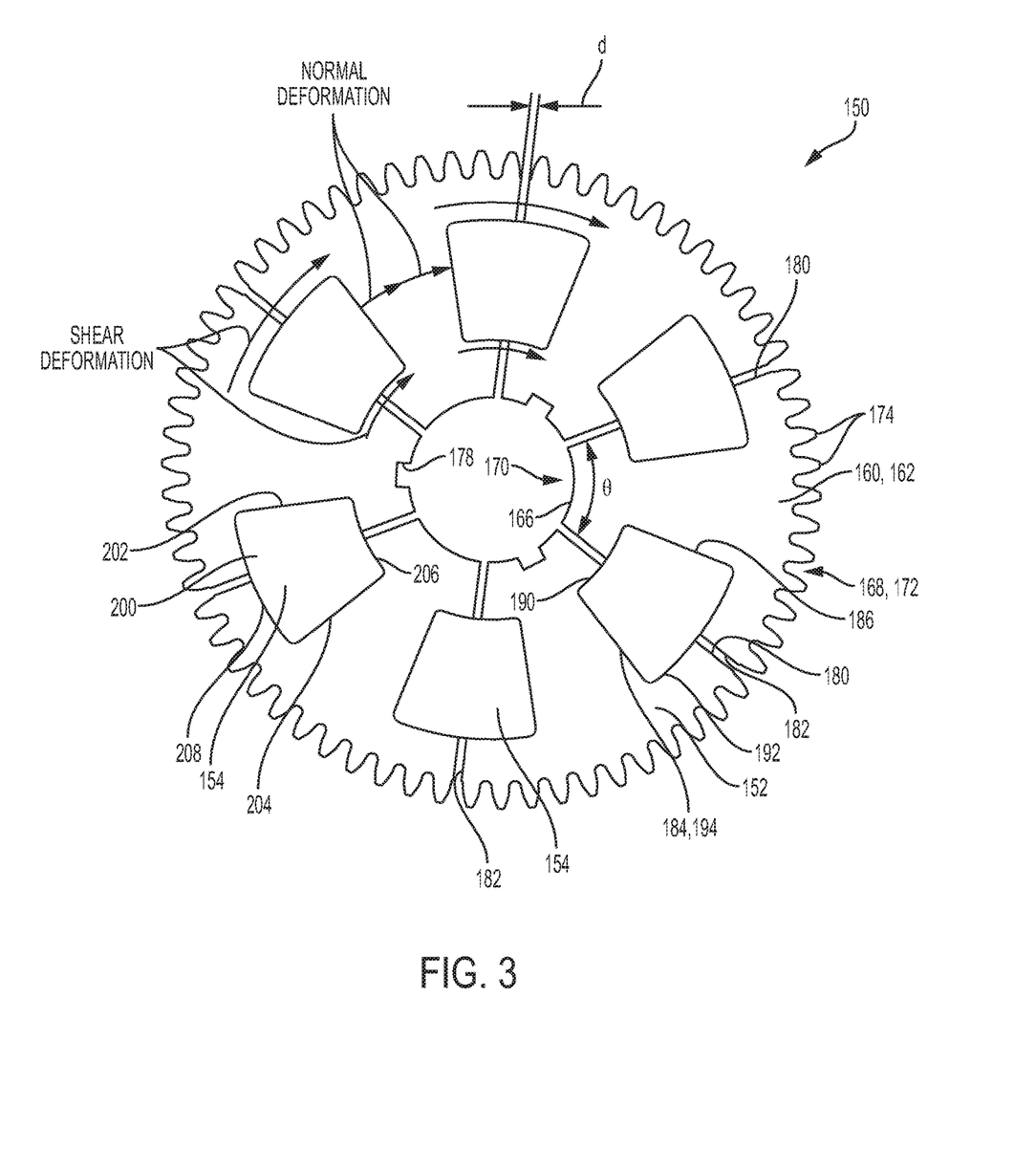
FIG. 3 illustrates a front view of a gear for use with the assembly of FIG. 2.
Figure 4:
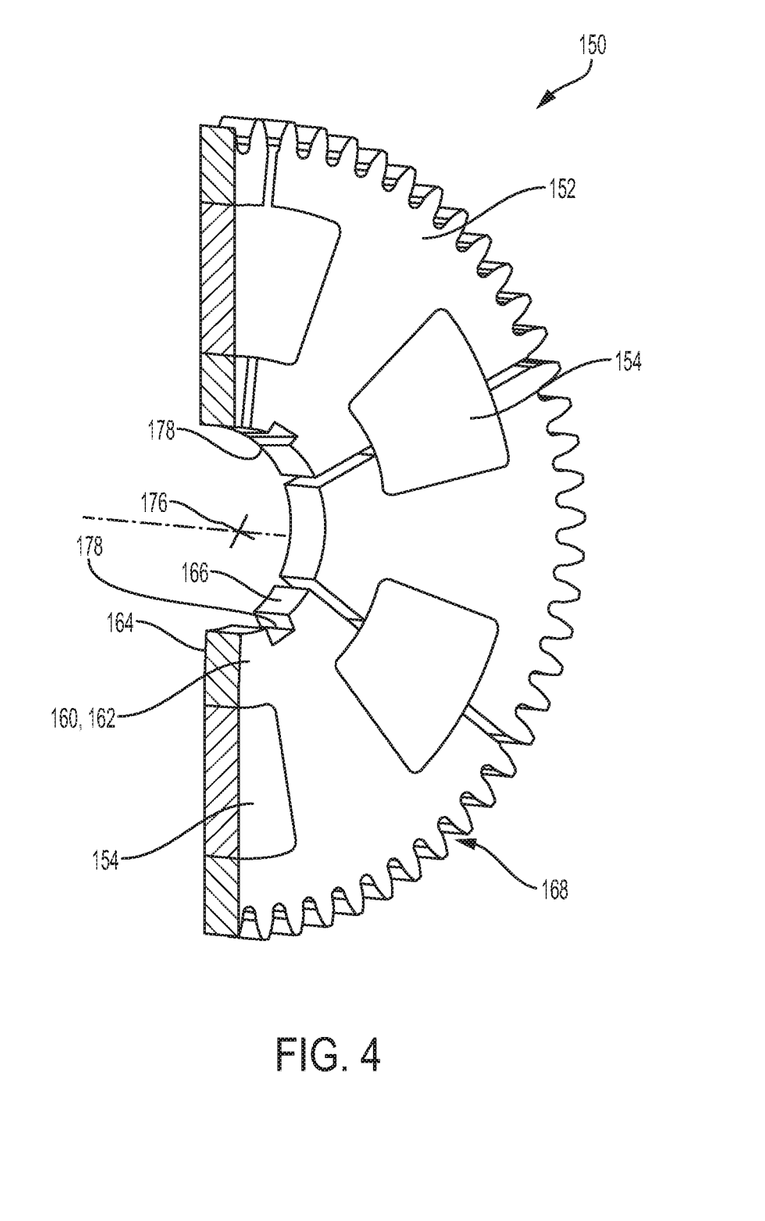
FIG. 4 illustrates a sectional perspective view of the gear of FIG. 3.

FIGS. 2-4 illustrate a balance shaft assembly and gear train according to an embodiment. FIG. 2 illustrates a perspective view of a balance shaft assembly 100 and crankshaft gear 42 according to an embodiment and for use with the engine 20 of FIG. 1. Elements in FIG. 2 have the same reference numbers as similar elements in FIG. 1 for simplicity. In other examples, the crankshaft and/or the engine may have more than one balance shaft. The balance shaft 44 may be provided for an engine with asymmetry. For example, in an engine with one or more cylinders, the movement of the pistons 24 and the connecting rods 28 may be asymmetrical throughout the crankshaft 26 rotation. For example, the descending and ascending pistons 24 are not always completely opposed or balanced in their movement and acceleration during a given period of crankshaft 26 rotation resulting in inertial forces and/or couples or moments with each crankshaft revolution that may additionally increase with increasing engine and crankshaft speed.

The crankshaft gear 42 or drive gear 42 couples to a crankshaft 26 for rotation therewith. The balance shaft 44 extends parallel to the crankshaft 26 and is eccentrically weighted. In one example, as shown, the balance shaft 44 has two eccentric counterweights 102, 104 or equal masses oriented at 180 degrees or opposite from each other, and placed at a specified distance from each other along the length of the balance shaft 44. In one example, the weights 102, 104 are formed as integral parts of the balance shaft 44, and in other examples, the weights 102, 104 that are connected to the balance shaft 44 for rotation therewith. The masses of the eccentric counterweights and their relative distance from one another depend on the level of the force or couple that needs to be balanced.

The balance shaft 44 has a driven gear 46 or balance gear connected thereto for rotation therewith. The drive gear 42 of the crankshaft is in meshed engagement with the driven gear 46 of a balance shaft such that rotation of the crankshaft 26 drives the balance shaft 44. The teeth of the drive gear 42 therefore interface or mesh with the teeth of the driven gear 46. The drive gear 42 and driven gear 46 may be selected to provide the desired gear ratio and speed ratio for the balance shaft compared to the crankshaft. The gears 42, 46 may have the same or a similar diameter, or the gears 42, 46 may be sized differently relative to one another to provide the desired gear ratio between the drive gear and the driven gear. In one example and as shown, the drive gear 42 and driven gear 46 are provided as intermeshed spur gears. In another example, the teeth may be provided by helical teeth, beveled teeth, or the like.

In a conventional system, the driven gear and the drive gear are provided by a conventional metal gears that are stiff and may lead to additional tonal noise (whine), or rattle noise, and the like based on the contact forces between the gear teeth as well as the torque fluctuations that are input to the gear train. Replacing a conventional metal gear with a gear formed from a material with increased damping characteristics, such as a solid plastic gear, may not be an option for the system due to the high torque fluctuations and low durability of the material. In other known gears, an annular ring of an elastomeric material has been provided between a circular central member and an outer gear ring member that are concentric with one another; however, in this arrangement, the annular ring of elastomeric material is loaded in, or deforms in, shear only, which prevents the use of this gear configuration in a helical teeth configuration and also may lead to other durability limitations.

Figure 5:
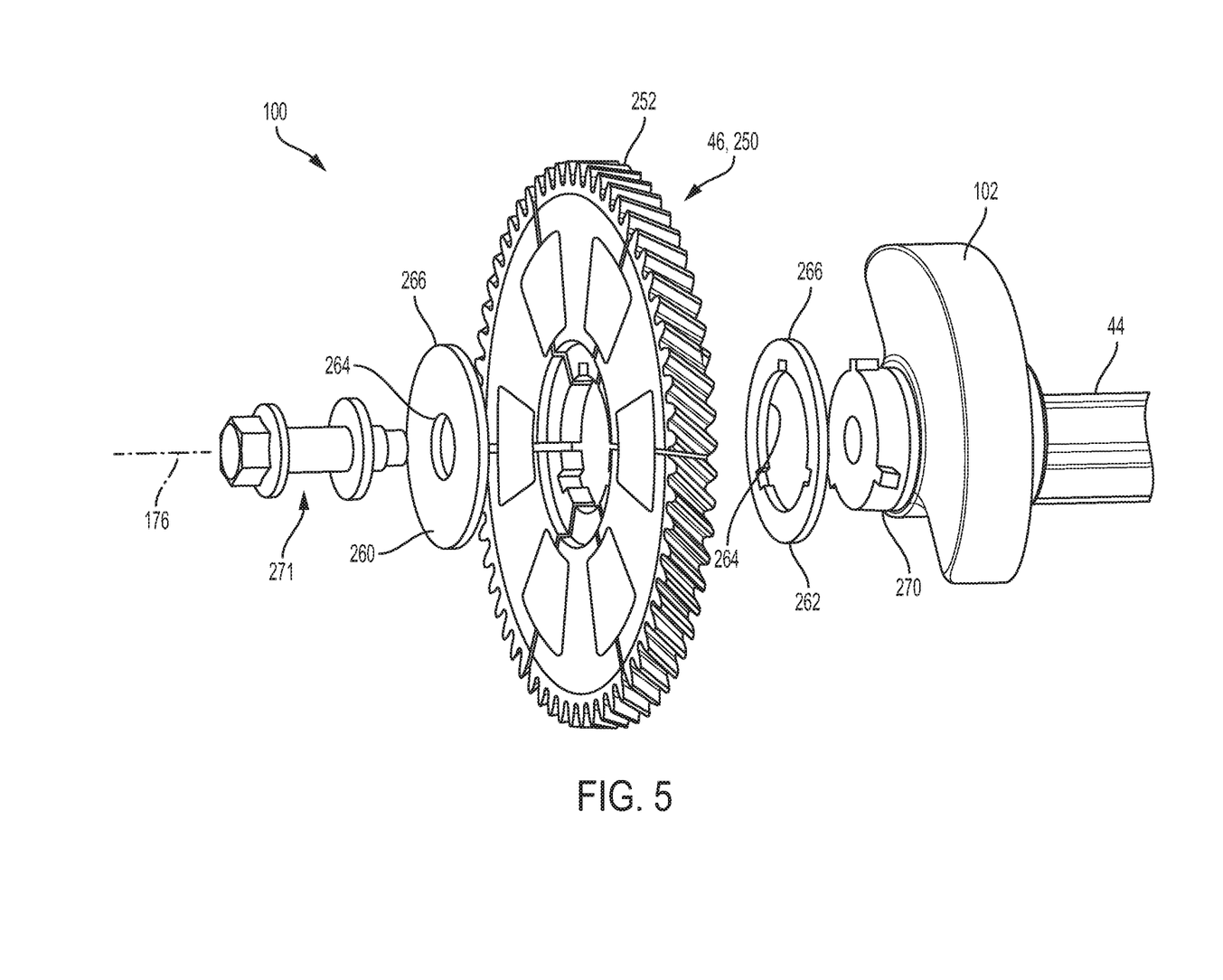
FIG. 5 illustrates a partial exploded perspective view of a balance shaft assembly for the engine of FIG. 1 according to another embodiment.
Figure 6:
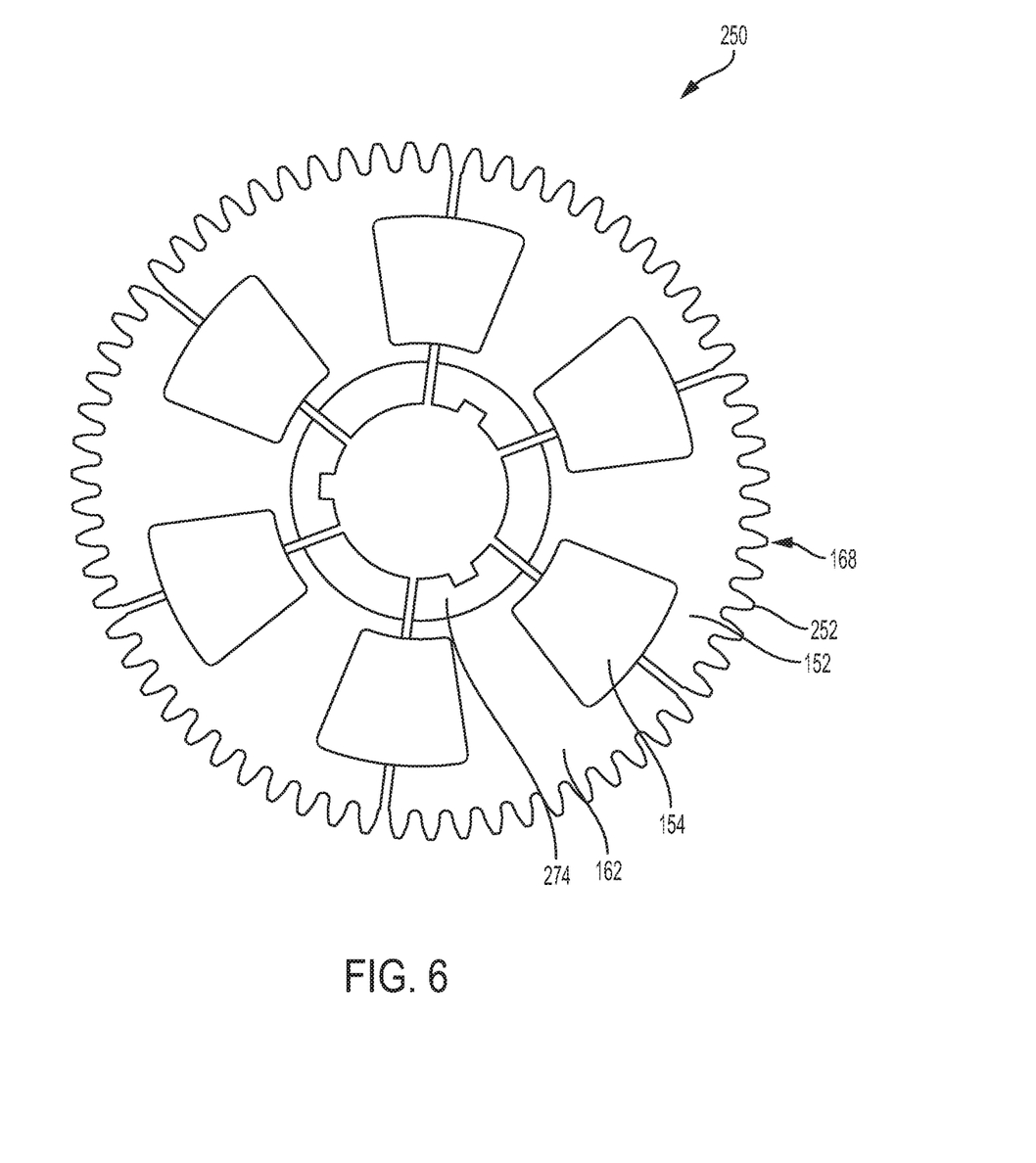
FIG. 6 illustrates a front view of a gear for use with the assembly of FIG. 5.
Figure 7:
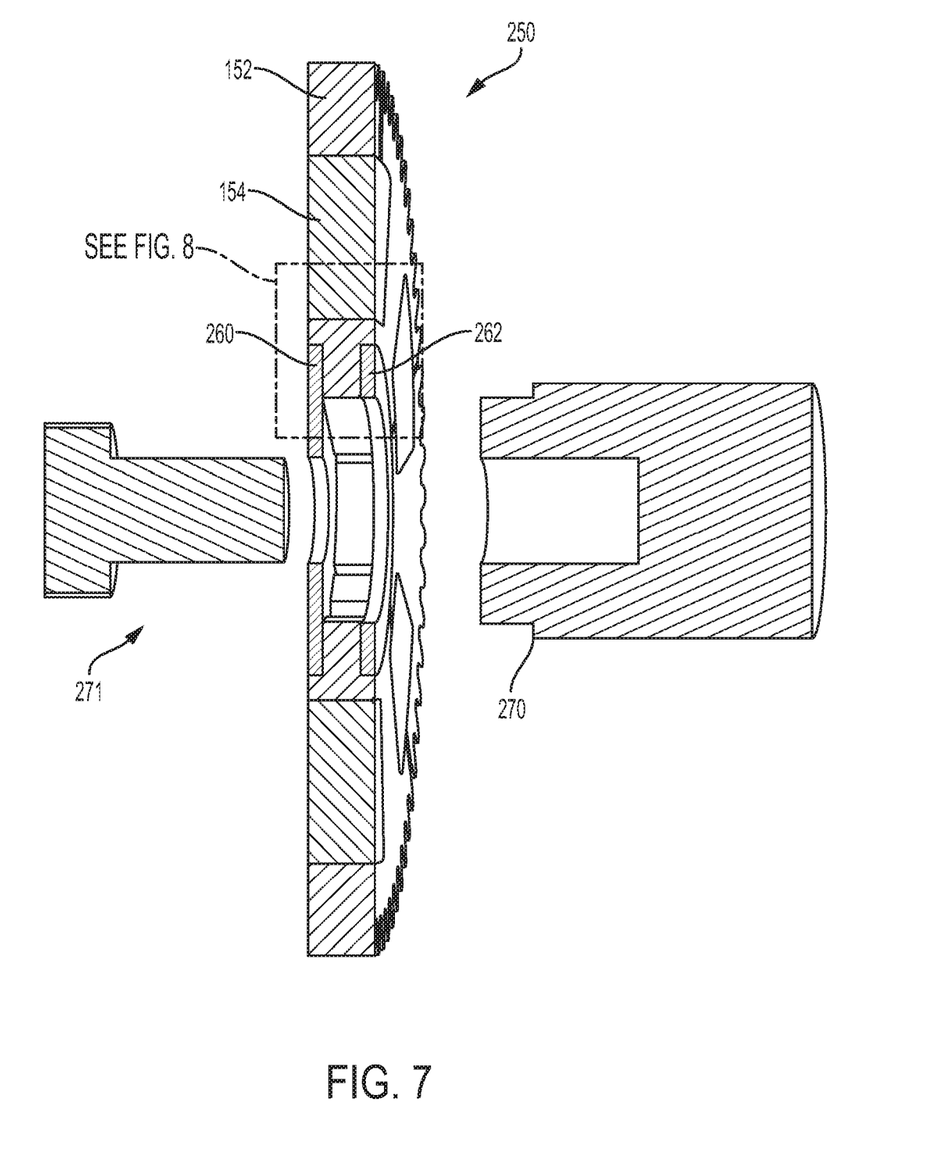
FIG. 7 illustrates a partial, sectional, exploded, perspective view of the gear and balance shaft of FIG. 5.
Figure 8:
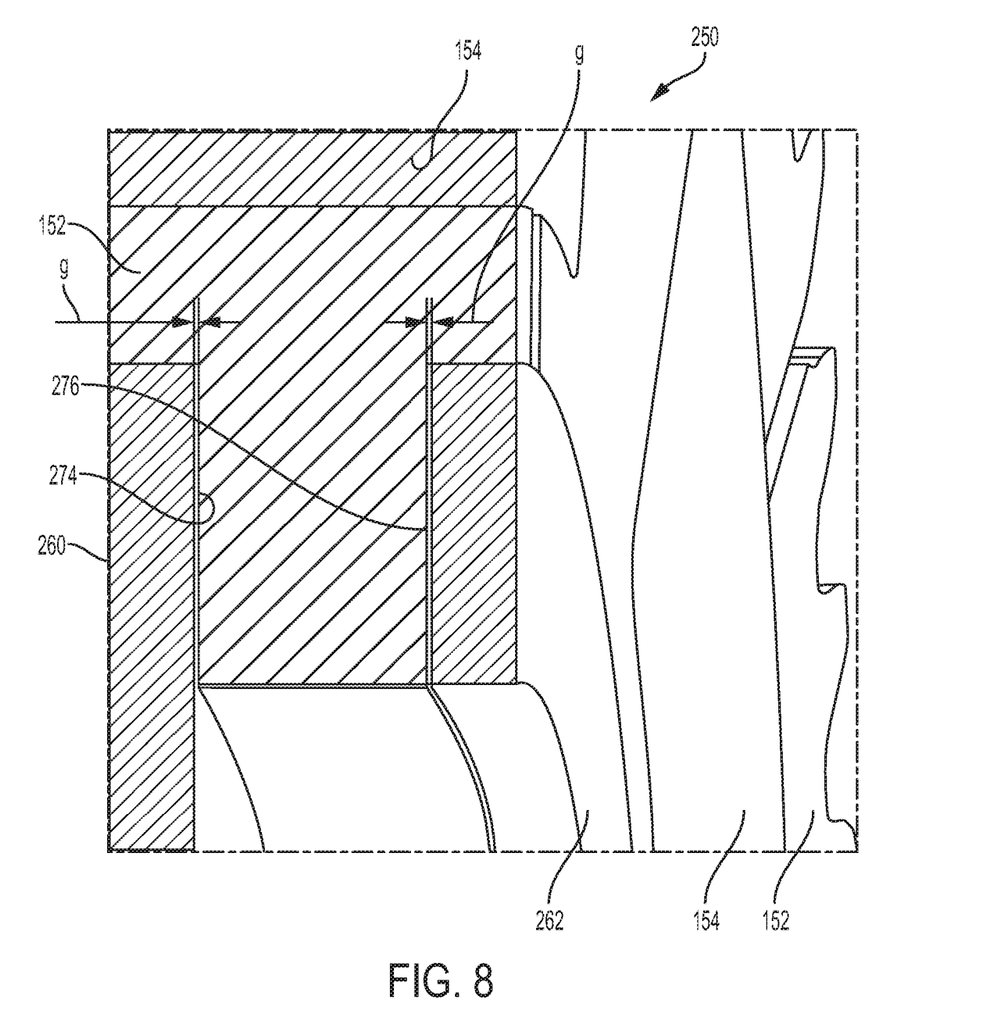
FIG. 8 illustrates an enlarged, partial sectional view of the gear and balance shaft of FIG. 7.

In the present disclosure, and as shown in FIG. 2 and described in greater detail below with respect to FIGS. 3 and 5, the drive gear 42 and the driven gear 46 are each provided by a mixed material gear structure formed by metal elements separated and connected by elastomer or resilient elements. The drive gear 42 and driven gear 46 according to the present disclosure provide both the necessary strength and durability for the gear train as well as provide the improved damping characteristics to reduce NVH in the gear train. In other embodiments according to the present disclosure, the balance shaft assembly 100 may be provided with a mixed material drive gear 42 and a conventional driven gear, or a conventional drive gear and a mixed material driven gear 46.

The gear according to the present disclosure is provided by alternating gear sectors and elastomeric blocks that cooperate to provide the gear structure, with the gear sectors being spaced apart from one another and connected by the intervening blocks. The gap or spacing between the gear sectors allows the elastomeric blocks to deform and thus damp contact forces between intermeshing teeth, absorb torque pulsations, and generally reduce NVH including gear whine and rattle. The elastomeric blocks are connected to the gear sectors such that the blocks are deformed both normally, e.g. in tension and/or compression, and in shear. The combination of normal and shear deformation of the blocks along with the large size of the blocks relative to the gear allows for the use of "softer" rubber elements which provides improved damping while maintaining durability for the element.

FIGS. 3 and 4 illustrate an example of a gear 150 for use as a drive gear 42 and/or a driven gear 46 for use with the crankshaft 26 and balance shaft assembly 100 or with the engine 20 according to the present disclosure. It is envisioned that the gear 150 as described herein may be used as intermeshed gears in other vehicle applications to counteract gear-to-gear related NVH such as gear whine, rattle, and the like.

The gear 150 is formed from a series of sectors 152 connected by a series of resilient and/or elastomeric blocks 154. Each block 154 is positioned between and connects adjacent sectors 152 such that adjacent sectors 152 are spaced apart from one another by a gap or distance (d) and do not contact one another.

The sectors 152 are formed from a first material, and in an example are formed from a metal or a metal alloy such as steel. The blocks 154 are formed from a damping material such as a resilient material or an elastomeric material, and in an example are formed from a rubber, synthetic rubber, RTV silicone material or the like. The material for the blocks 154 may additionally be selected for thermal stability and chemical and wear resistance for use in harsh environments, e.g. an engine 20 compartment with high temperatures and circulating lubricant.

Each sector 152 or segment is formed as a portion or sector of a disc or gear. Each sector 152 is provided by a body 160 that has a first and second faces 162, 164 extending radially outwardly from a curved inner side 166 to a curved outer side 168. The curved inner side 166 is arc-shaped, and the curved outer side 168 is also arc-shaped.

The curved inner sides 166 of the sectors 152 cooperate to provide a central aperture 170 for the gear 150 when assembled. The curved outer sides 168 of the sectors 152 cooperate to provide an outer perimeter 172 for the gear 150 when assembled. The curved outer side 168 of each sector additionally defines a series of teeth 174 such that the curved outer sides 168 of the sectors cooperate to provide gear teeth extending circumferentially about the gear 150 when assembled. In the example shown, the teeth 174 are provided as teeth that are parallel to an axis of rotation 176 of the assembled gear, such as in a spur gear. The curved inner sides 166, and the curved outer sides 168 of the sectors 152 of the gear generally lie along two concentric circles centered on the rotational axis 176 of the gear.

At least some of the sectors 152 define a keyway 178. In the example shown, the curved inner side 166 of alternating sectors 152 in the series of sectors each defines a keyway 178. The gear 150 therefore has multiple keyways 178 that are configured to mate with corresponding locating keys on a shaft such as a balance shaft 44 or the crankshaft 26. The remaining sectors 152 are provided without keyways 178, or the shaft is without keys in this region to allow for movement of these sectors relative to the shaft, and to damp NVH. As the gear 150 has a degree of flexibility caused by the interconnecting structure of the sectors 152 and blocks 154, multiple, radially spaced keyways 178 provide for an even and smooth torque transfer and load distribution between the drive and driven gears 42, 46 and from the driven gear to the shaft.

The body 160 of each sector 152 has first and second sides 180, 182 extending radially between and intersecting the inner and outer curved sides 166, 168, and intersecting the first and second faces 162, 164. The first and second sides 180, 182 are spaced apart by an angle $\theta$. In one example as shown, each of the sectors 152 may be formed using the same angle $\theta$, and in other examples, the angle of the sectors 152 may vary, thereby providing different sized sectors for a gear. In one example, the series of sectors 152 is provided by (n) sectors, and each sector is defined by an angle $\theta$ that is less than 360/n, which allows for separation between adjacent sectors 152 when the gear is assembled with (n) blocks 154. In one example, as shown, the gear 150 has six sectors 152 and six blocks 154. In other examples, the gear 150 may have a greater or fewer number of sectors 152 and blocks 154.

The first and second sides 180, 182 may extend perpendicularly to the first and second faces 162, 164 of the sector 152, and be co-planar or parallel with the rotational plane of the gear 150. In other examples, the first and second sides 180, 182 may be angled relatively to the first and second faces 162, 164 so as to form an acute angle with the rotational plane of the gear 150.

The first side 180 defines a first recess 184 sized to receive a portion of a block 154. The second side 182 defines a second recess 186 sized to receive a portion of a block 154. Each of the recesses 184, 186 may be provided as a concave recess or a partially concave recess. For each sector 152, the first and second concave recesses 184, 186 may be positioned to be generally opposite to one another, and may be the same size and shape, and positioned in a similar radial position on the sector. In other examples, the first concave recess 184 and the second concave recess 186 may have different shapes or sizes, and may be offset from one another. The concave recesses 184, 186 each define surfaces to connect to the elastomeric blocks 154 that impart forces to the blocks to cause the blocks to deform normally (e.g., in tension and/or compression) and in shear, e.g. the concave recesses have surfaces that extend both radially and in the direction of gear rotation or tangentially thereto.

Each sector 152 therefore defines first and second opposite concave recesses 184, 186 sized to receive adjacent blocks 154, respectively. The first concave recess 184 of one sector receives a portion of a block 154, and the second recess 186 of the adjacent sector receives another portion of the block 154. The series of blocks 154 are therefore interlaced with the series of sectors 152 such that sectors and blocks alternate with one another about the gear 150.

Each concave recess 184, 186 may be defined by first and second walls 190, 192 connected by a third wall 194. In one example, the first and second walls 190, 192 are curved or arc-shaped and are concentric with the curved inner side 166 and curved outer side 168 of the sector 152. For example, the first concave recess 184 may be defined by inner and outer arc-shaped walls 190, 192 intersecting the first side 180 of the sector with a radial wall 194 extending between the inner and outer arc-shaped walls 190, 192 and spaced apart from the first side 180. The second concave recess 186 may likewise be defined by inner and outer arc-shaped walls intersecting the second side of the sector with a radial wall extending between the inner and outer arc-shaped walls and spaced apart from the second side.

In other examples, each concave recess 184, 186 may be provided by a semi-circular shape, a rectangular shape, or other combinations of linear and/or complex curved shapes that cooperate to form a concave recess. In further examples, the concave recess 184, 186 may include smaller, local convex regions, for example, if the concave recess was provided as a T-shape or the like, which would also assist in retaining the block to the associated sectors via an interface fit.

Each block 154 in the series of block is provided by a body 200 having an outer perimeter with one portion that is sized to fit within and mate with the first concave recess 184, and another portion that is sized to fit within and mate with the second concave recess 186. In an example, each resilient block 154 is defined by first and second radial sides 202, 204 extending between an inner arc-shaped wall 206 and an outer arc-shaped wall 208. The inner arc-shaped wall 206 mates with the first walls 190 of the first and second concave recesses 184, 186. The outer arc-shaped wall 208 mates with the second walls 192 of the first and second concave recesses 184, 186. The blocks 154 may be connected to the associated sectors 152 using an adhesive material, or using other mechanical or chemical fastening techniques.

Although the first and second recesses 184, 186 of the sectors and the associated blocks 154 are shown as uniform with one another, it is also contemplated that the blocks 154 and corresponding recesses 184, 186 may vary with respect to one another about the gear 150. For example, alternating blocks may be provided with different sizes, shapes, and/or radial positions on the associated sector to control the gear movement, connectivity, and damping properties.

FIGS. 5-8 illustrate another example of a balance shaft assembly 100 for use with the crankshaft 26 or with the engine 20 according to the present disclosure. With reference to FIGS. 5-8, the crankshaft gear or drive gear is provided with helical teeth or teeth that with leading edges that are nonparallel with the axis of rotation of the gear. The driven gear 46, 250 as shown therefore is also provided with teeth with leading edges that are nonparallel with the axis of rotation 176 of the gear, e.g. helical teeth. Elements in FIGS. 5-8 are given the same reference numbers as similar elements in FIGS. 1-4 for simplicity, and the description above with respect to FIGS. 2-4 generally applies to FIGS. 5-8.

Each gear sector 152 defines a series of gear teeth 252 along an outer curved edge 168, with the leading edges of the gear teeth nonparallel with the axis of rotation 176 of the gear, e.g. as helical teeth. The helical teeth 252 for the gear may provide quieter operation and reduced NVH and whine. However, the helical teeth 252 of the meshed gear train introduces a resultant force along the rotational axis of the gear. The gear 256 is therefore provided with first and second thrust plates 260, 262 to counteract the resultant force and stabilize and locate the gear 250 on the shaft 44.

The thrust plates 260, 262 cooperate with the gear 250 to control the axial movement of the gear 250 along the shaft. As shown, the driven gear 46, 250 is positioned between the first and second thrust plates 260, 262 on the balance shaft.

Each thrust plate 260, 262 defines a central aperture 264 and an outer circumferential edge 266. The radius of each thrust plate 260, 262 to the outer edge 266 is less than the radius defined by the inner wall 190 of the first or second recesses 184, 186 such that the thrust plates 260, 262 do not overlap with or contact any of the resilient blocks 154. The thrust plates 260, 262 may be located on the shaft 44 via shoulders 270 or other locating features on the shaft and/or the mounting assembly 271.

The first and second faces 162, 164 of the gear sector 152 may each further define a recessed region 274, 276 that extends from the inner curved side 166 towards the first and second concave recesses 184, 186, with the recessed regions 272, 276 ending radially inboard of the first and second concave recesses 184, 186.

The width or thickness of the gear 250 taken between the two thrust plates 260, 262, e.g. between the recessed regions 274, 276, is therefore less than the distance between the thrust plates. A gap (g) is therefore provided between each of the thrust plates 260, 262 and the gear 250. These gaps prevent a fixed connection between the sectors 152 of the gear to allow movement between gear sectors 152 based on the connections of the blocks 154 and provide damping and noise reduction. The gaps are sized to prevent excessive or large axial movements of the gear sectors 152 and gear, while providing sufficient movement to allow damping.

Figure 9:
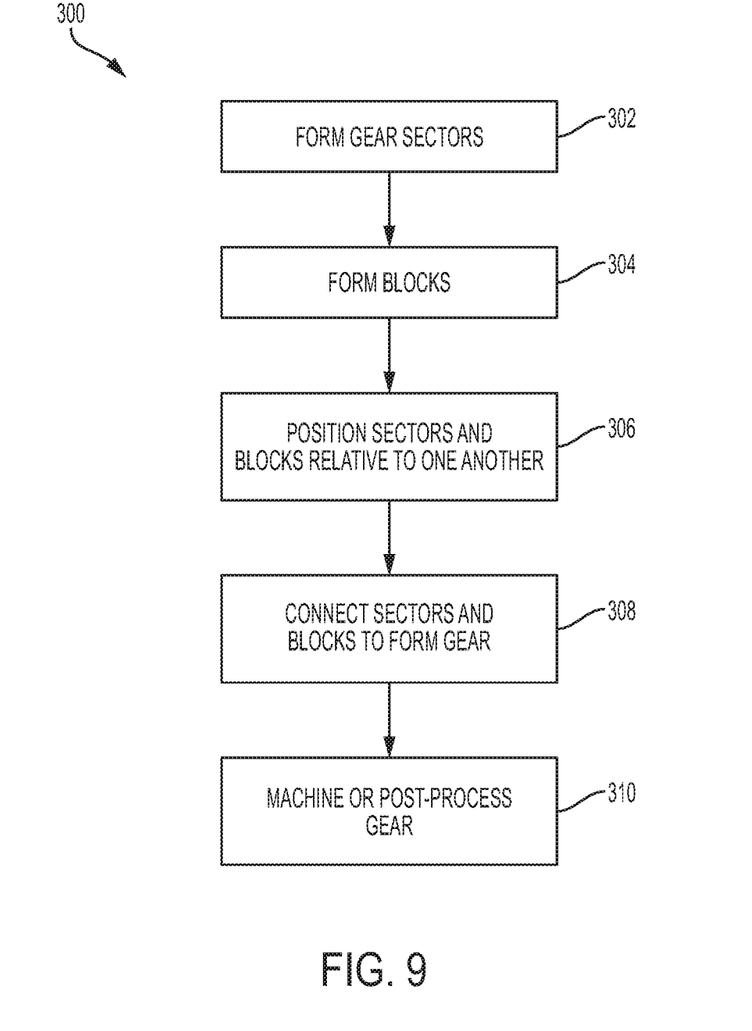
FIG. 9 illustrates a flow chart for a method of forming and arranging gears for a vehicle shaft assembly according to an embodiment.

FIG. 9 illustrates a flow chart of a method 300 according to an embodiment. The method includes forming a gear 42, 46, 150, 250 for a vehicle shaft. The method 300 may have a greater or fewer number of steps than shown, and the steps may be rearranged to be performed in another order.

At step 302, a series of gear sectors 152 are formed for a gear 42, 46. The gear sectors may be formed from metal or a metal alloy. The sectors may each be individually formed, for example, from powdered metal or using an electric discharge machining (EDM) technique. Alternatively, the gear sectors may be formed as a larger blank, and then sliced or divided into the individual sectors. The sectors may be formed by forging, die casting, net shape or near net shape die casting, investment casting, and the like. The sectors may require heat treatment such as sintering, or another process. The sectors are each formed to extend from an arc-shaped inner side to an arc-shaped outer side, and with first and second sides extending radially between and intersecting the inner and outer sides. For each sector, the first side defines a first concave recess, and the second side defines a second concave recess. The first and second concave recesses may be formed when the sector is formed, or may be machined or later formed into the sector.

At step 304 a series of elastomeric blocks 154 are formed for the gear 42, 46. The blocks may be individually molded or formed.

At step 306, each block 154 of the series of blocks is positioned between adjacent gear sectors 152 such that it is received by the first concave recess 184 of one of the sectors and the second concave recess 186 of an adjacent sector.

At step 308, the series of blocks 154 and the series of gear sectors 152 are connected or attached to one another to form a gear for a vehicle shaft with adjacent sectors spaced apart from one another by a gap (g). The blocks 154 and sectors 152 may be connected to one another via an interference fit, an adhesive material, other mechanical and/or chemical fasteners, or a combination thereof. Each elastomeric block 154 is therefore configured to deform both normally and in shear and thereby provides damping and reduced NVH for the gear.

At step 310, the central aperture 170 and the teeth 174 for the gear sectors 152 are cut or otherwise formed. The central aperture and the teeth may be cut or formed into the sectors 152 separately and prior to assembling the gear, or may be roughly formed prior to assembly with a fine machining or manufacturing process to follow. The teeth 174 may be formed or further defined via machining, including gear cutting, hobbing, gear shaping, milling, or broaching, and may be heat treated or coated to increase wear resistance or reduce friction.

These steps may be repeated to form the other of the drive gear 42 or the driven gear 46 for the gear train.

Various embodiments have associated non-limiting advantages. For example, a gear train for a balance shaft assembly is provided with at least one gear that is formed using alternating gear sectors and elastomeric blocks to provide a mixed material gear structure, such that the gear sectors are spaced apart from one another. The elastomeric blocks allow for movement of the gear sectors relative to one another, and therefore provide damping and NVH reduction for the gear train. The elastomeric blocks are connected to the gear sectors via concave recesses that allow for both deformation of the elastomeric block in shear and normally, which allows for use of the gear in various tooth configurations, including spur and helical, that would otherwise be unavailable. By using a mixed material gear as described herein, NVH, including gear whine and rattle, may be controlled and mitigated at the source, e.g. the intermeshing gear teeth, while the gears retain the necessary stiffness and durability for a vehicle or balance shaft assembly application.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An engine system comprising:
    a crankshaft gear coupled to a crankshaft of an engine for rotation therewith; and
    a balance gear coupled to a balance shaft for rotation therewith, the balance gear and crankshaft gear in meshed engagement, the balance gear formed by a series of sectors connected by a series of resilient blocks, each sector defining first and second recesses along opposite radial edges sized to receive adjacent blocks, respectively, wherein each sector has a first and second face extending radially outwardly from a curved inner side to a curved outer side, each sector having first and second sides extending radially between and intersecting the inner and outer sides.

2. The engine system of claim 1 wherein the crankshaft gear is formed by another series of sectors and another series of resilient blocks, each sector defining first and second recesses along opposite radial edges sized to receive adjacent blocks, respectively.

3. The engine system of claim 1 wherein the first side of each sector defines the first recess, and the second side of each sector defines the second recess.

4. The engine system of claim 1 wherein the curved inner side of alternating sectors in the series of sectors each defines a keyway.

5. The engine system of claim 1 wherein the first recess of each sector is defined by first and second walls connected by a third wall; and
    wherein the second recess of each sector is defined by first and second walls connected by a third wall.

6. The engine system of claim 5 wherein the first and second walls of each of the first and second recesses are concentric with the curved inner side and curved outer side of the sector.

7. The engine system of claim 6 wherein each resilient block is defined by first and second radial sides extending between an outer arc-shaped wall and an inner arc-shaped wall.

8. The engine system of claim 1 wherein the curved outer side defines a series of teeth.

9. The engine system of claim 8 wherein the series of teeth of each of the sectors are provided as helical teeth; the engine system further comprising:
    first and second thrust plates, the balance gear positioned between the first and second thrust plates on the balance shaft.

10. The engine system of claim 9 wherein a width of the balance gear between the first and second thrust plates is less than a distance between the first and second thrust plates.

11. The engine system of claim 9 wherein the first and second thrust plates are radially inboard and nonoverlapping with the series of resilient blocks.

12. The engine system of claim 1 wherein each sector of the series of sectors comprises metal; and
    wherein each resilient block of the series of resilient blocks comprises an elastomeric material.

13. The engine system of claim 1 wherein adjacent sectors are in direct contact with and spaced apart from one another by one of the series of resilient blocks positioned therebetween.

14. The engine system of claim 1 wherein the series of sectors is provided by (n) sectors, and wherein each sector is defined by an angle that is less than 360/n.

15. A gear for a vehicle shaft comprising:
    (n) metal sectors, each sector having first and second faces extending radially outwardly from an arc-shaped inner side to an arc-shaped outer side, the outer side defining a series of teeth, each sector having first and second sides extending radially between and intersecting the inner and outer sides, the first side defining a first recess, the second side defining a second recess; and
    (n) elastomeric blocks, each block positioned between and connecting adjacent sectors to be spaced apart from one another, a portion of each block received by the first recess of one of the sectors, another portion of each block received by the second recess of another one of the sectors;
    wherein the first recess is defined by inner and outer arc-shaped walls intersecting the first side of the sector and a radial wall extending between the inner and outer arc-shaped walls and spaced apart from the first side;
    wherein the portion of the block received by the first recess has an outer perimeter shaped to mate with the inner and outer arc-shaped walls and radial wall of the first recess;
    wherein the second recess is defined by inner and outer arc-shaped walls intersecting the second side of the sector and a radial wall extending between the inner and outer arc-shaped walls and spaced apart from the second side;

wherein the portion of the block received by the second recess has the outer perimeter shaped to mate with the inner and outer arc-shaped walls and radial wall of the second recess;

wherein each block is in direct contact with both of the respective first and second recesses of adjacent sectors to connect the adjacent sectors; and wherein, for each sector, the arc-shaped inner side, the arc-shaped outer side, and the inner and outer arc-shaped walls of the first and second recesses are concentric with one another.

16. The gear of claim 15 wherein (n)/2 sectors define a keyway in the inner side, and (n)/2 sectors are without a keyway.

* * * * *